United States Patent [19]
Ochiai

[11] Patent Number: 6,158,663
[45] Date of Patent: Dec. 12, 2000

[54] CARD HAVING A TACTUALLY RECOGNIZABLE INDICATION

[76] Inventor: Nobuyoshi Ochiai, 37-15, Motobuto 1-chome, Urawa-shi, Saitama 336, Japan

[21] Appl. No.: 08/945,331

[22] PCT Filed: Feb. 21, 1996

[86] PCT No.: PCT/JP96/00395

§ 371 Date: Dec. 18, 1997

§ 102(e) Date: Dec. 18, 1997

[87] PCT Pub. No.: WO97/30853

PCT Pub. Date: Aug. 28, 1997

[51] Int. Cl.$^7$ .................................................. G06K 19/06
[52] U.S. Cl. ........................................... 235/492; 235/375
[58] Field of Search ................................... 235/486, 492, 235/493, 380, 375

[56] References Cited

U.S. PATENT DOCUMENTS

| | | | |
|---|---|---|---|
| 3,943,335 | 3/1976 | Kinker et al. | 235/379 |
| 4,591,937 | 5/1986 | Nakarai et al. | 360/101 |
| 4,761,542 | 8/1988 | Kubo et al. | 235/379 |
| 4,868,849 | 9/1989 | Tamaoki | 379/357 |
| 5,473,148 | 12/1995 | Tanaka et al. | 235/462 |

FOREIGN PATENT DOCUMENTS

| | | |
|---|---|---|
| 62-3766 | 1/1987 | Japan . |
| 62-38175 | 3/1987 | Japan . |
| 4-83671 | 7/1992 | Japan . |

*Primary Examiner*—Thien M. Le
*Attorney, Agent, or Firm*—Paul A. Guss

[57] ABSTRACT

A card which is readable by a card reader is provided, in which an insertion direction of the card relative to the card reader, and a transactional function of the card can be easily recognized by visually handicapped users. In particular, the card is made up of a card body having a machine readable portion thereon which is readable by the card reader only when the card is inserted in a predetermined direction, and further includes an indication formed in the card body. Such an indication enables a user to tactually recognize the insertion direction with respect to the card reader, as well as the purpose or transactional function of the card, merely by means of touching the card with one's fingers. In a first mode of the invention, the indication is provided by a depression or a projection, whereas according to other modes, cutouts, or a slanted side edge of the card body may provide the desired indication of direction or function of the card. A promotional card having a detachable section is also proposed in which the cutout is formed upon detachment of the detachable section. A set of cards may also be provided, each having a different transaction functional, as indicated by different indications, or positions of indications, on the respective cards.

2 Claims, 5 Drawing Sheets

CARD HAVING A TACTUALLY RECOGNIZABLE INDICATION

FIELD OF THE INVENTION

The invention relate to a card which has an information recording portion thereon and which is used, for example, as a prepaid payment card, a credit card, a debit card, or the like.

DESCRIPTION OF THE RELATED ART

Recently, prepaid payment cards, credit cards, debit cards, and the like, made of a card body having an information recording portion thereon, are frequently used in public telephones, along highways, on railroads, for shopping, or for performing banking procedures, etc. For most cards used for performing such transactional functions, the direction of insertion of the card into a card reader is determined in order to ensure positional alignment of the information recording portion of the card with a reading position of the card reader. However, cards of this type which have been used hitherto merely bear a print of an arrow on their surfaces for indicating the proper insertion direction, with or without printing of some additional wording explaining that the card should be inserted in the direction of the printed arrow.

Therefore, users must visually recognize the indication. It is difficult to visually discriminate the insertion direction of the card with respect to the card reader, particularly for visually handicapped persons, or when the card is used in a dark place, and such users often experience the inconvenience that the card must be reinserted into the reader repeatedly, after changing its direction of insertion.

Also, there are different kinds of cards having various transactional functions for accomplishing different purposes. With conventional cards, users must distinguish the purpose of use of a particular card through means of a visual print, or pattern of letters, appearing on the surface of the card. It is therefore very difficult for a visually handicapped person to distinguish whether a card in his or her hand is the card that he or she currently intends to use. Considering the numerous types of cards that are progressively increasing and being used for various purposes and fields of society, this drawback creates a serious problem.

The invention is therefore directed to the problem that existing cards having an information recording portion thereon are inconvenient for use in dark places or for visually handicapped persons, because they have no means of indicating the insertion direction, or the specific kind or purpose of use of the card, through tactile sensation.

SUMMARY OF THE INVENTION

To solve the above-described problems, the present invention is characterized in that a card includes a card body having a tactually recognizable indication, which indicates the kind of card or purpose of its use, as well as the insertion direction of the card relative to a card reader.

With such means, users can confirm, both visually and tactually, the kind or purpose of use of the card, along with its insertion direction relative to the card reader, and hence it is especially useful for visually handicapped persons.

According to the first mode of the present invention, there is provided a card having a tactually recognizable depression or projection.

According to the second mode of the present invention, there is provided a card having a tactually recognizable cutout.

According to the third mode of the present invention, there is provided a card having a tactually recognizable indication formed along a peripheral edge of the card body.

According to the fourth mode of the present invention, there is provided a card having a tactually recognizable indication of a predetermined shape, and provided at a predetermined position on the card body depending on the specific kind or purpose of use of the card.

DETAILED DESCRIPTION OF THE PREFERRED EMBODIMENTS

Preferred embodiments according to the first mode of the present invention shall now be described with reference to FIGS. 1 through 4.

In these embodiments, a card body 1 has a thin, generally rectangular configuration and is made of a plastic or cardboard material having a suitable thickness. For example, a magnetic layer is formed on the entire back surface of the card body to form an information recording portion 2.

The card body has a tactually sensible indication 3 in the form of a depression or a projection made by a press. The indication 3 is preferably formed in a asymmetric position on a plane of the card body 1 so that the position of the indication gives knowledge on the insertion direction relative to a card reader. In other words, as shown in any of FIGS. 1 through 4, the indication 3 is not located along a central axial line of the card body 1, but rather is positioned so as to be offset from such a central axial line.

Figure 1:
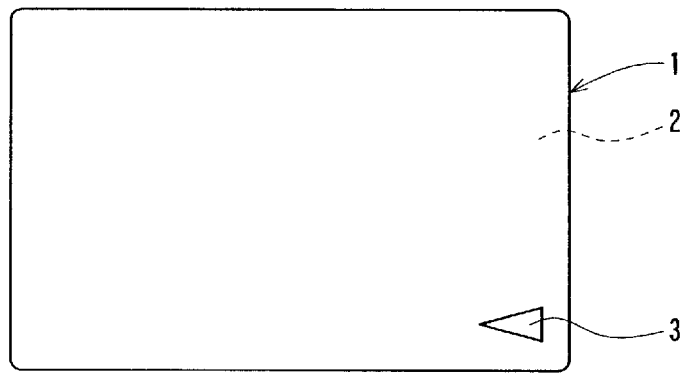
FIGS. 1 to 4 are plan views showing embodiments according to the first mode of the present invention.
Figure 2:
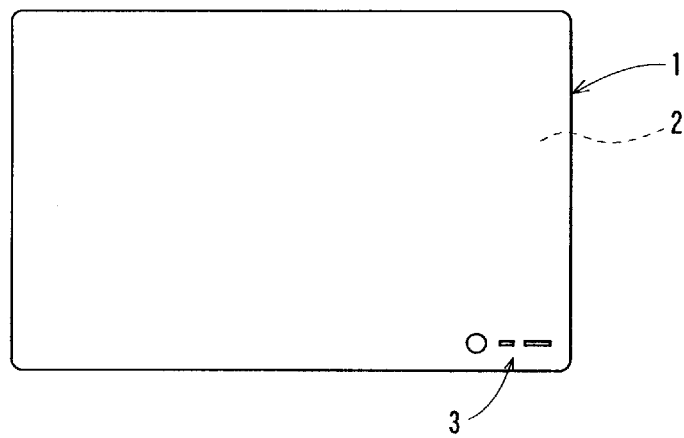
Figure 3:
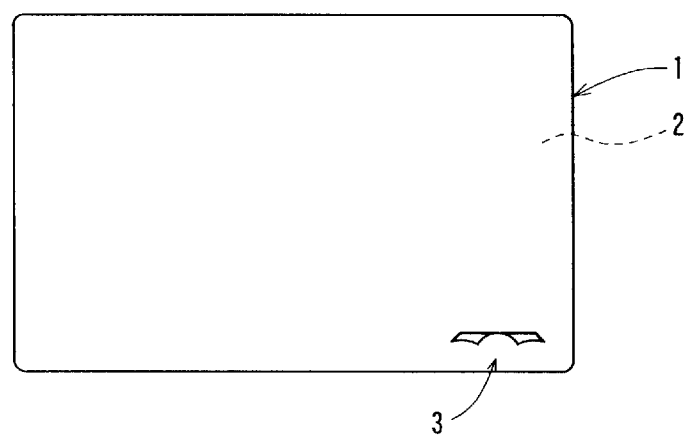
Figure 4:
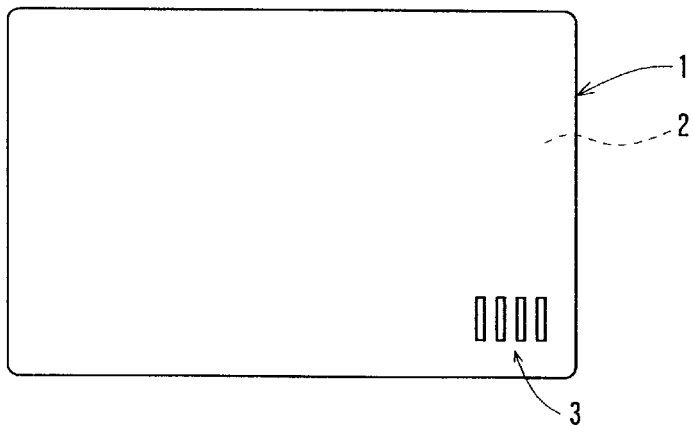

FIG. 1 illustrates a triangular indication, FIG. 2 illustrates an indication in the form of a combination of a point and a line, FIG. 3 illustrates a wave-shaped indication, and FIG. 4 illustrates a bar-code indication.

Positions and configurations of the indications 3 can be easily recognized merely by touching them with the finger (s), because they are projected or depressed from a level defined by the plane of the card.

Accordingly, users can determine the insertion direction of the card relative to the card reader (not shown) from the position of the indication, and in addition, can easily distinguish the kind or purpose of use of the card, or other useful information, using his or her tactile sense through use of one's fingers, from the configuration of the indication itself.

Especially, in the embodiments shown in FIGS. 2 through 4, the cards can also bear various pieces of information in the form of braille markings, for example.

Various different forms of depressions or projections are usable as the indication 3, as long as they can be tactually recognized through human fingers. Accordingly, the invention is not limited to the embodiments discussed above. Additionally, any appropriate method may be employed for forming the indication on the card body.

FIGS. 5 to 10 illustrate preferred embodiments according to the second mode of the present invention, which differ from the embodiments shown in FIGS. 1 to 4 in that the indication 3 is a cutout.

Figure 5:
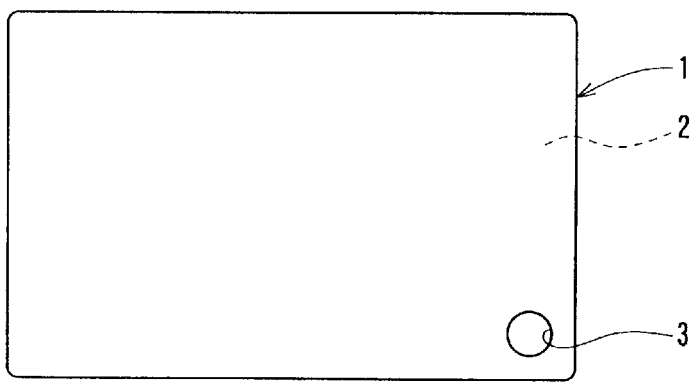
FIGS. 5 to 10 are plan views showing embodiments according to the second mode of the present invention.
Figure 6:
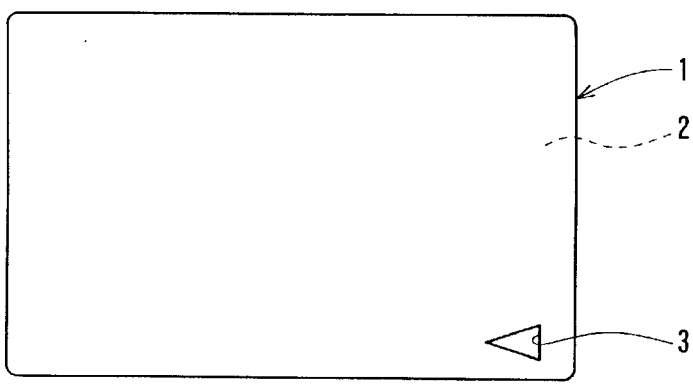
Figure 7:
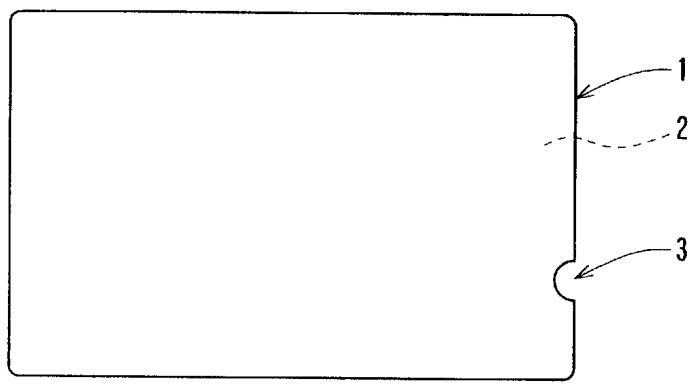
Figure 8:
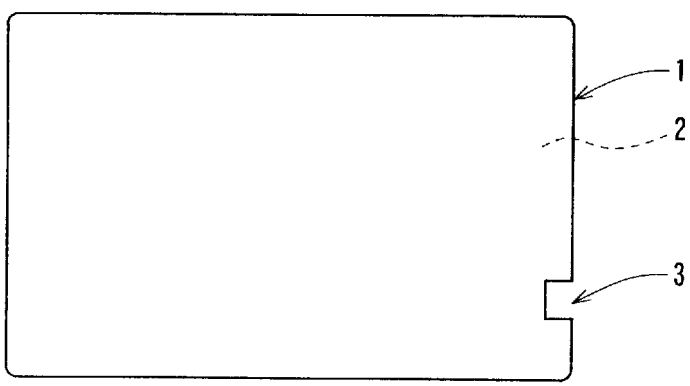

FIGS. 5 and 6 illustrate indications 3 in the form of triangular and circular bores which may be made by punching, for example. FIGS. 7 and 8 illustrate indications 3 in the form of semi-circular and V-shaped notches each made along a peripheral edge 4 of the card body 1.

In these embodiments, the insertion direction relative to a card reader, and the kind or purpose of use of the card, etc., can be tactually recognized very easily from the position of the indication formed on the card body 1, and the shape of the indication, in a manner similar to the embodiments shown in FIGS. 1 through 4.

Figure 9:
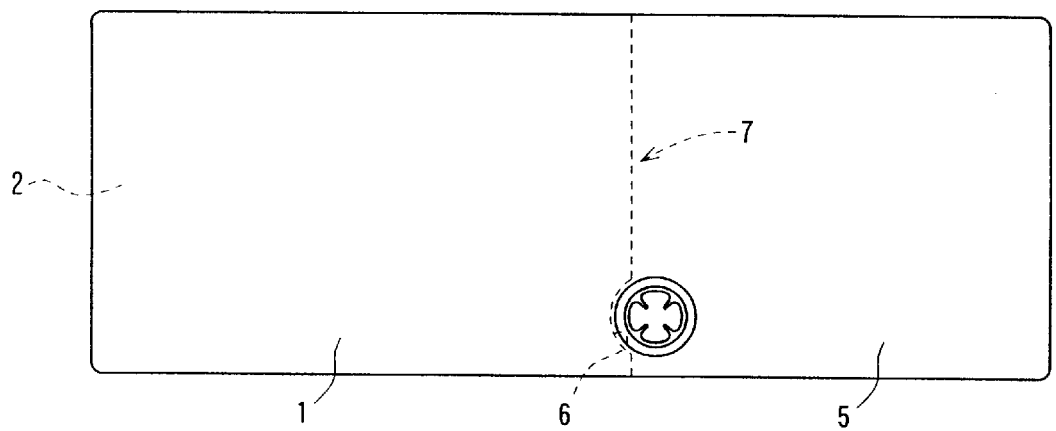
Figure 10:
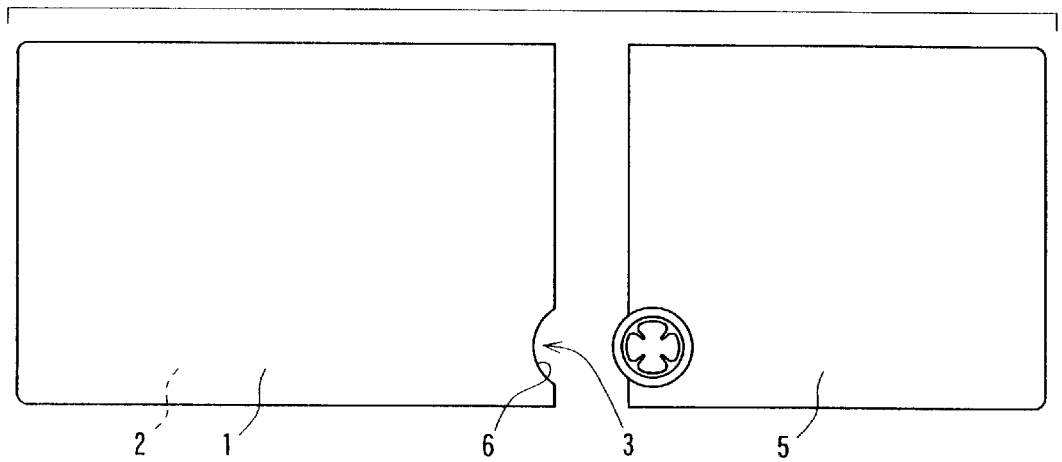

FIG. 9 illustrates a card member 2 which includes a commemorative card 5 and a card body 1 which can be readily cut and separated along a cutting line 7 having a row of slits. As shown in FIG. 10, when the commemorate card 5 is cut and detached from the card body 1, an indication 3, in the form of a notch, is created and appears along the cutting line 7.

Figure 11:
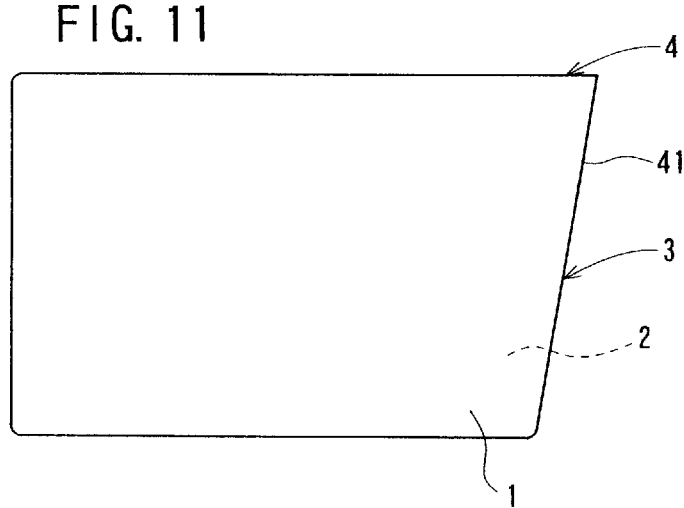
FIGS. 11 and 12 are plan views showing embodiments according to the third mode of the present invention.
Figure 12:
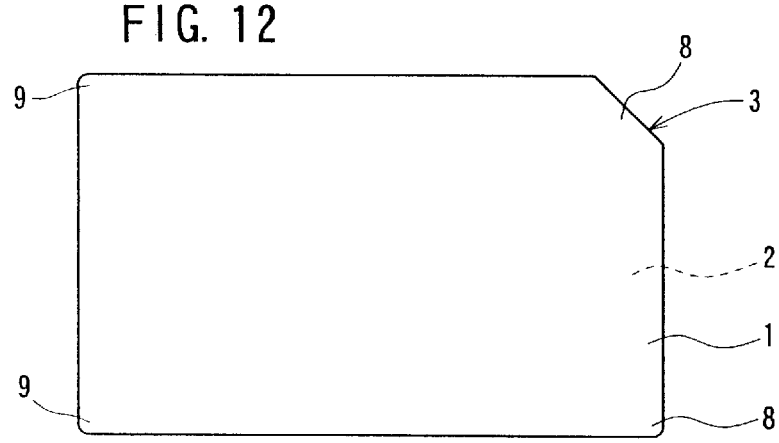

FIGS. 11 and 12 illustrate preferred embodiments according to the third mode of the invention. FIG. 11 illustrates an indication 3 in the form of a sloped edge 41 provided on one of four sides of the card body 1, wherein as shown, three of the sides are each generally perpendicular to an adjacent side, whereas the sloped edge 41 defines a side which is disposed non-orthogonally with respect to the other three sides. FIG. 12 illustrates an indication 3 which is provided as a specific configuration for one corner 8 of the card body 1 and which is different from the configurations of the other three corners 9 of the card body 1. With these embodiments, a user can readily ascertain the insertion direction of the card relative to a card reader merely by tracing along the sides 4 of the card body 1 with his or her finger(s).

Figure 13:
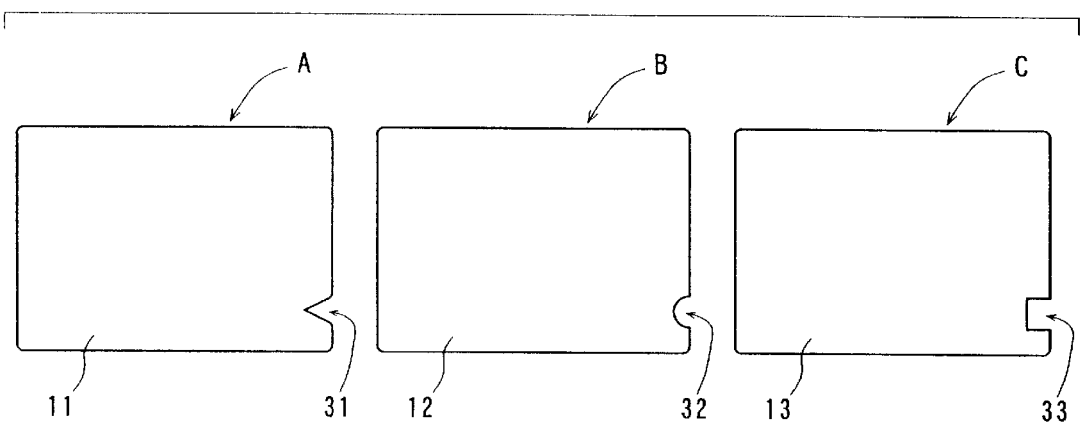
FIGS. 13 to 15 are plan views showing embodiments according to the fourth mode of the present invention.
Figure 14:
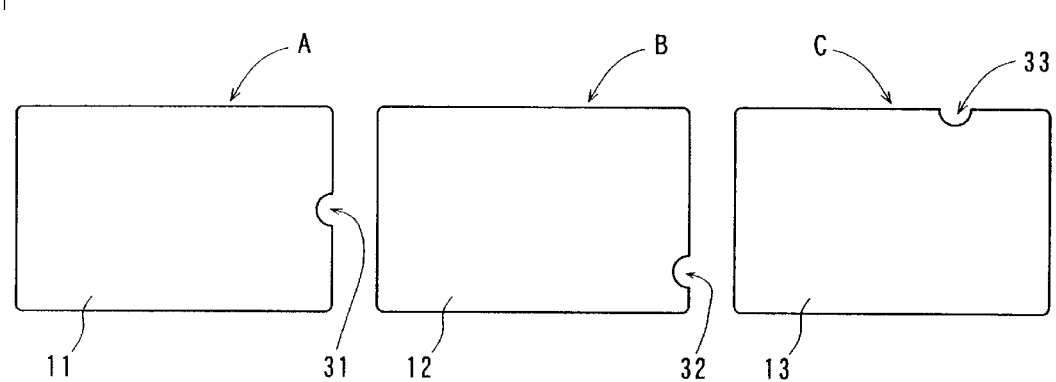
Figure 15:
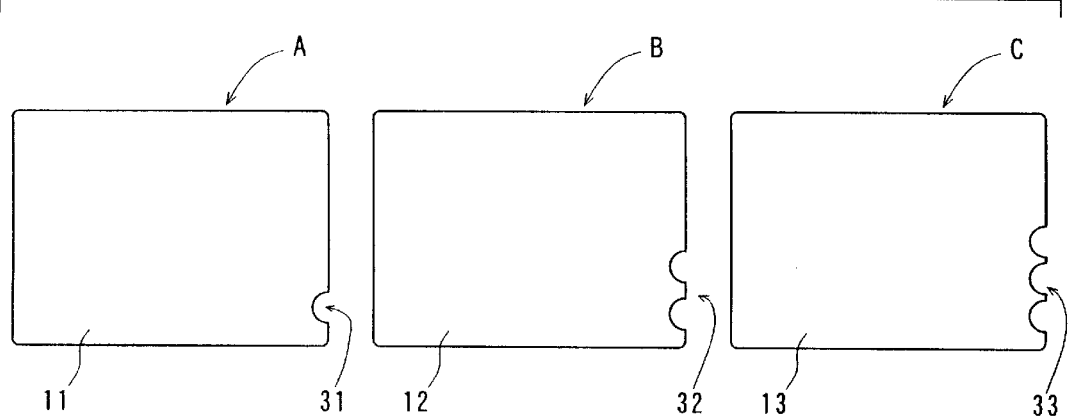

FIGS. 13 to 15 illustrate preferred embodiments according to the fourth mode of the present invention, in which a set or plurality of cards are provided. Such a set is made up of different kinds of cards having different purposes of use (i.e. for effecting different transactional functions), respectively, and wherein the cards are provided with different modes of indication 3 thereon, which indicate not only the insertion direction of each card relative to a card reader, but also the specific kind or purpose of use for each respective card.

In the embodiment shown in FIG. 13, cards A, B and C make up a set, wherein each card has a different kind or purpose of use. The cards A, B and C have different-shaped indications 31, 32 and 33 which are, for example, different shapes of cutouts formed at predetermined same positions of the card bodies 11, 12 and 13. In this embodiment, card A having the indication 31 (V-shaped cutout) may be used for accessing public telephones, card B having the indication 32 (semi-circular cutout) may be used for purchasing railway tickets, and card C having the indication 33 (rectangular cutout) may be used for shopping. Thus, a user of these cards can readily distinguish both the specific kind or purpose of use of each card, together with its insertion direction relative to a card reader, merely by touching the indication 31, 32 or 33 with his or her finger(s).

In the embodiment shown in FIG. 14, cards A, B and C make up a set, wherein each card has a different kind or purpose of use. The cards A, B and C have indications 31, 32 and 33, all of which are in the form of a semi-circular cutout, for example, but wherein such cutouts are located at different positions of the card bodies 11, 12 and 13, respectively, to enable a user to tactually distinguish both the specific kind or purpose of use of each card, as well as the proper insertion direction, through use of his or her finger(s).

FIG. 15 illustrates a set of cards A, B and C, each being a different kind of card, and having indications 31, 32 and 33 which comprise different numbers of identically-shaped cutouts, thereby attaining the same functions and advantages of the embodiments shown in FIGS. 13 and 14.

INDUSTRIAL APPLICABILITY OF THE INVENTION

By using tactually sensible indications on card bodies, the present invention makes it very easy to quickly distinguish both the insertion direction of a particular card relative to a card reader, as well as the card's specific kind or purpose of use, even when the card is used in a dark place or by a visually handicapped person.

It is also possible to select appropriate configurations and positions of indications on such cards, which can be recognized both visually and tactually, thereby to facilitate both visually handicapped and ordinary users to readily distinguish both the insertion direction and the specific kind or purpose of use of his or her card.

In addition to information as to its insertion direction and the kind or purpose of use, the card may also include other kinds of information, such as a message, for example.

Further, according to the present invention, the tactually sensible indication may be made either originally with issuance of the card, or upon or during actual use of the card by a user. In the latter case, information concerning the actual status of use of the card may be added sequentially as additional tactually sensible indications.

What is claimed is:

1. A card for insertion into a card reader, comprising:
    a card body;
    a machine readable portion on said card body which is readable by said card reader only when said card body is inserted into said card reader in a predetermined direction;
    a tactually recognizable indication positioned asymmetrically with respect to at least one center axial line of said card body, for indicating an insertion direction of said card body, wherein said indication comprises a cutout in said card body for indicating a kind or purpose of use of the card, further comprising a detachable section detachably connected to said card body, wherein said cutout is created in said card body only when said detachable section is detached from said card body.

2. A card for insertion into a card reader, comprising:
    a card body;
    a machine readable portion on said card which is readable by said card reader only when said card body is inserted into said card reader in a predetermined direction;
    a tactually recognizable indication positioned asymmetrically with respect to at least one center axial line of said card body, for indicating an insertion direction of said card body,
    wherein said card body is a four-sided roughly rectangularly shaped body, having three edges thereof each of which is disposed at a 90° angle with respect to an adjacent edge, and wherein said indication comprises one edge of said card body which is non-orthogonally disposed with respect to said three edges of said card body.

* * * * *